March 20, 1951  J. S. BAKER  2,545,867
BUTTON TYPE ARRESTER
Filed Aug. 29, 1946  2 Sheets-Sheet 1
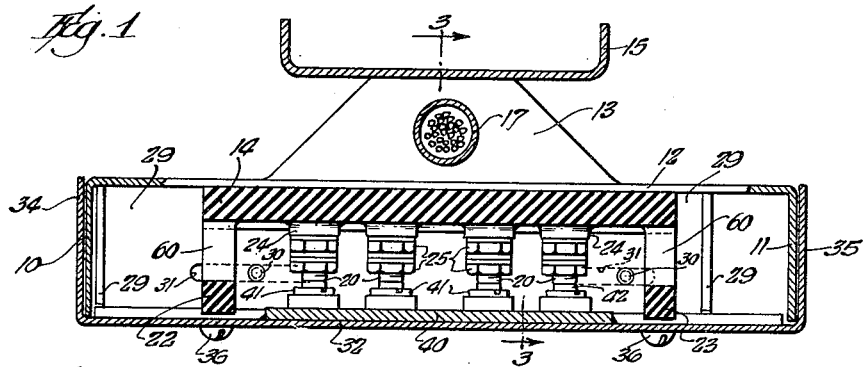
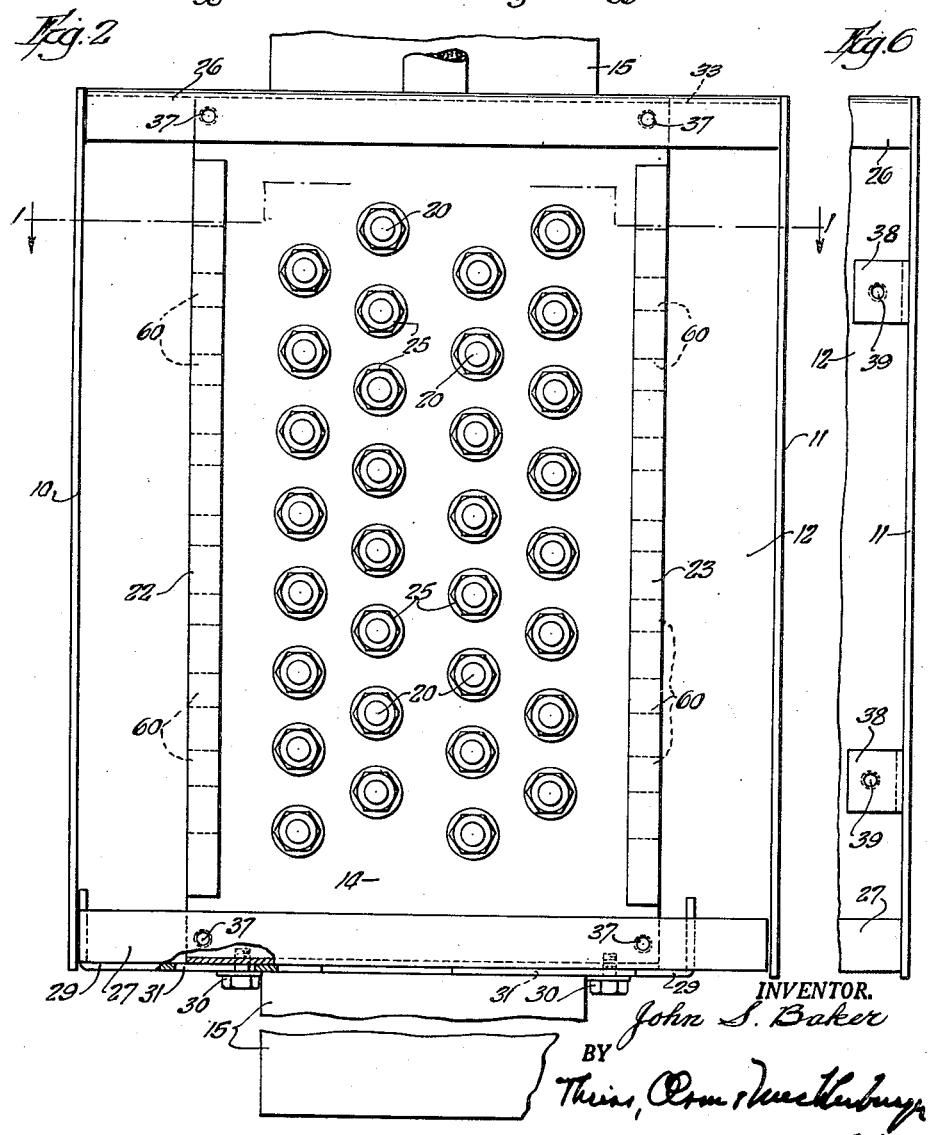
INVENTOR.
John S. Baker
BY
Thies, Orm Mecklenburg
Attys.

March 20, 1951     J. S. BAKER     2,545,867
BUTTON TYPE ARRESTER
Filed Aug. 29, 1946     2 Sheets-Sheet 2
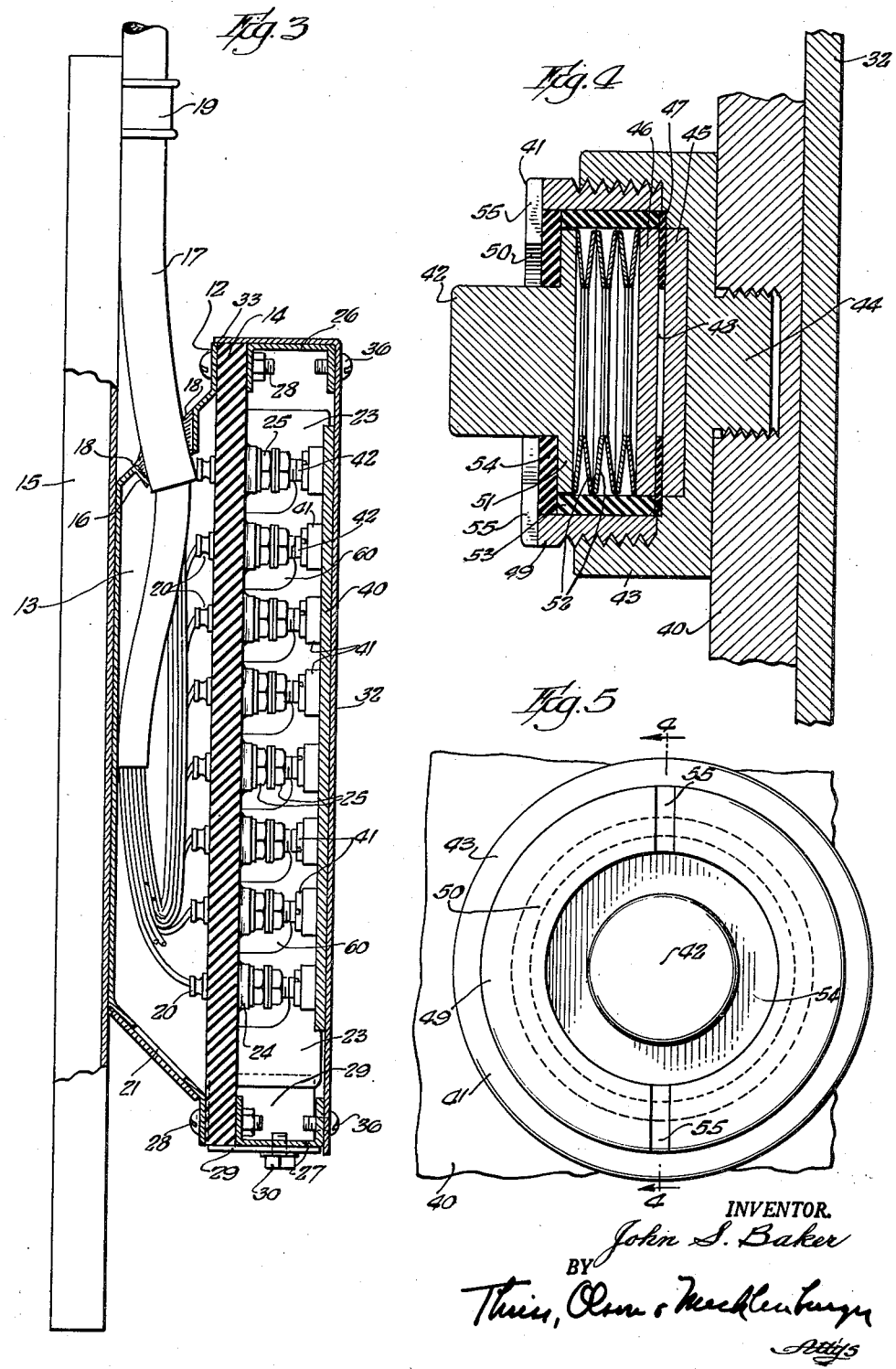
INVENTOR.
John S. Baker
BY Thiess, Olsen & Mecklenburger
Attys Patented Mar. 20, 1951

2,545,867

UNITED STATES PATENT OFFICE 2,545,867

BUTTON TYPE ARRESTER

John S. Baker, Chicago, Ill., assignor to Cook Electric Company, Chicago, Ill., a corporation of Illinois Application August 29, 1946, Serial No. 693,796

1 Claim. (Cl. 313—325)

This invention relates to protective structures and apparatus, particularly for cable terminals, such as terminal boxes adapted to be mounted on telephone poles or other supports carrying telephone line cables to provide for ready connection to the drop wires leading to the subscribers' instruments.

It is more or less common practice to install such boxes or cable terminals without special arrester protection therein for the individual lines. Such lines may be few in number, of short length, in a neighborhood thought to be comparatively free from disturbances or in general in a locality not warranting the installation of a larger, more expensive type of cable terminal. If disturbances are found to exist in certain lines, reliance may be placed on protective devices installed at the particular subscriber's stations.

However the danger is ever present, high potential power lines may be erected and endanger all or only a portion of the lines, or other conditions may exist making it desirable that all or a portion of the lines radiating from a terminal be protected. Yet the conditions may be such that new or more expensive types of terminals are deemed unwarranted.

It is an object of the present invention to provide an arrester or discharger and cable terminal construction and apparatus whereby, at comparatively small expense, any or all the lines from the cable terminal may be provided conveniently and at any time with the desired protection.

Further objects are the provision of such protection without requiring changes in construction of the boxes themselves or their installations other than in the covers, whereby the extra cost of manufacture, installation and maintenance is kept to the minimum, and the protection may be readily afforded to the boxes in use.

Further objects are the provision of arresters on a removable support over the studs of a cable terminal and in operative relation thereto, whereby the latter may be exposed by removing the support and the lines connected to the studs be protected when the support is secured in place; the provision of readily attachable and detachable unitary arresters on such support, and the provision of such a support on the cover of the housing of the terminal.

Still further objects are the provision of self-contained unitary or button-type arresters or dischargers which may be detachably and individually secured to such supports and which may have spring terminals suitably to engage or operatively connect the arresters with the studs or fixed part of the installation when the support or cover is in place on the terminal box or other device.

Still further objects and advantages will appear from the description and claim to follow, in connection with the accompanying drawings which illustrate, by way of example but not of limitation, an embodiment of the invention, and in which:

Fig. 1 is a cross section of the terminal box taken on the line 1—1 of Fig. 2, the upper end of the cable-cavity at the rear of the box, however, being shown in full plan;

Fig. 2 is a front elevation of the box in mounted position but with the cover removed;

Fig. 3 is a vertical section of the box on the line 3—3 of Fig. 1, the cable being shown in full;

Fig. 4 is a central section on an enlarged scale through the button arrester or discharger and its support, said section being taken on the line 4—4 of Fig. 5;

Fig. 5 is an end or face view of the arrester on a similar scale and looking toward the right in Fig. 4; and Fig. 6 (Sheet 1) is a detail fragmentary view corresponding to Fig. 2 showing an alternative way of securing the cover to the box.

As illustrated in these drawings, the cable terminal structure comprises a housing, preferably of sheet metal such as pressed steel, having forwardly extending sides 10 and 11 and a rear wall 12. Rear wall 12 is dished outwardly to form a cavity portion 13 at the back of the insulated mounting or faceplate 14, and its edge walls are drawn with a slight taper away from the rear wall, as indicated in Figs. 1 and 3, in the direction of the mounting bracket 15. The housing may be mounted upon and secured to the bracket 15 in any of the well known ways, which bracket may then be suitably fastened to the usual telephone pole or other support.

In forming the housing a recessed opening 16 may be provided in one wall of the cavity portion through which a cable 17 is adapted to enter. Solder 18 may then be puddled in this recess to form a tight connection between the cable and the housing. The cable may then extend up along the bracket 15 and through the strap 19 carried by the bracket 15.

The cable conductors thus entering the cavity 13 may be fanned out and secured respectively to the rear ends or heads of contact studs or binding posts 20 mounted in and extending through the faceplate 14, as by half hitches and soldering the same thereto, or in other desired manner. After the connections are so made, the cavity 13 may be filled with any suitable molten insulating compound, which upon hardening serves to maintain those connections in their proper arrangement. A hole 21 with a removable cover may be provided in another wall of the cavity 13 for such filling of the cavity with compound.

The face or base plate 14 is provided with forwardly extending insulating fanning strips 22 and 23 at the two side edges, which parts are preferably molded in one piece of suitable insulation material, although this is optional and may vary. The binding posts or studs 20 on the face of the plate 14 extend through raised mountings or bosses 24 molded on said face which tend to eliminate surface leakage. They may be arranged in staggered vertical rows and the studs preferably provided with squared heads firmly embedded in the mounting plate to prevent turning. On their forward ends they are provided with the usual threaded binding nuts 25 to receive the drop wires leading to the subscriber's instruments.

Across the top and bottom edges of the mounting plate 14 are channel bars or members 26 and 27 extending the full width between the side walls 10 and 11 of the housing. Bolts 28 at the four corners of the mounting plate 14 pass through the inside flanges of the channels 26 and 27, the mounting plate 14 and the outside housing 12 to secure all these parts together. The inside flange of the top channel 26 may be slit from the edge to the web of the channel at the vertical edges of the back plate 14, and the end portions of that flange then turned or bent back into line with the web to thereby fill in the opening from the web to the housing 12.

At the lower channel 27, provision is made for taking out the drop wires to the subscriber's stations. This may be done by severing the web and inside flange of the channel in line with the edges of the mounting plate 14, leaving only the top flange intact to the sides 10 and 11 of the housing. Then by mounting a sliding plate 29 secured by screw 30 sliding in slot 31 on the outside of the web of the channel 27, at each side, the openings for the drop wires may be closed so far as possible to keep out snow, rain, dirt, and insects at said openings. Suitable springs may be provided to constantly urge said cover plates 29 toward their closed positions.

A sheet metal cover 32 for the box may be provided, said cover having a top wall 33 and side walls 34 and 35. This cover, therefore, may be slipped or pushed over the box from the front and removed in the same way.

This cover may be secured tightly to the box by screws 36 inserted from the outside and threading into holes 37 in the top or outer flanges of the channels 26 and 27.

As an alternative method of securing the cover in closed position, as indicated in Fig. 6, suitable angle brackets 38 may be welded or otherwise secured to the inside faces of the housing side walls 10 and 11, and the cover 32 be provided with suitable screws, similar to the screws 36, passing therethrough and threading into holes 39 in the inwardly projecting legs of said brackets 38.

In either case the cover may be firmly secured in closed position for various reasons, among which may be mentioned that the dischargers or arresters now to be described may be carried by the cover and arranged to contact respectively with the forward ends of the contact studs or binding posts 20 to establish conductive relation therewith for carrying off and safely grounding the high potential charges to which the telephone lines may be subjected.

In order to accomplish this in a simple and practical manner, the inside of the cover is provided with a metal plate 40, welded or otherwise fastened thereto and of a size to cover the area of the studs 20 on the back plate 14. Individual arresters or dischargers, preferably of the button type and generally designated 41, are removably attached to the inside of this plate 40 opposite the said contact posts or studs 20 on the back plate 14 when the cover is closed on the terminal box. Each discharger 41 is preferably provided with a protruding contact terminal 42 which is resiliently supported in the discharger and is of a sufficient area of contact surface inevitably to engage and make proper conductive contact with the binding post or stud 20 opposite it when the cover is closed. These terminals 42 normally stand out far enough to be pressed back by the studs 20, when the cover is closed, to make sure that a good contact is established with each other, notwithstanding some variations in height of the studs or dischargers or precise axial alignment of the same.

As shown on an enlarged scale in Figs. 4 and 5, the discharger or arrester 41 preferably is of the button type, and in this instance may comprise a metallic body, shell or casing member 43 having a threaded stem 44 adapted to be screwed into a suitable threaded hole in the inner face of the plate 40 which, as stated, covers the area of all studs and of course is provided with such a threaded hole opposite each stud when the cover is in place.

This body preferably seats firmly and squarely on the said plate and makes good electric conductive connection therewith. It may be readily attached to or detached from the plate. While the outside is shown cylindrical, it may be flat-sided, such as hexagonal, octagonal, or any desired form.

Within this hollow body, shell, or casing 43 are located the two spark gap electrodes 45 and 46 and dielectric 47 between them. The electrodes may be of the same material and size, and are preferably small circular discs of suitable high-grade carbon. The bottom electrode 45 fits and is seated in the bottom recess of the body 43 and therefore in good contact therewith. The dielectric 47 may be in the form of a thin ring of celluloid or other suitable material, with a comparative large circular opening 48 in the mid section, and its outer periphery extending beyond the outer peripheries of the electrodes 45 and 46 and substantially to the inner wall of the hollow cap member 49 (to be described). By this means the inner electrode 46 is positively separated by the insulating dielectric 47 from the metal of the body 43 even at the adjacent annular corner surrounding the electrode 45. The said electrode is also insulated from the metal cap 49 by the insulating spacing sleeve 53. The two electrodes, as usual, are suitably spaced and conductively separated by the dielectric 47 and air gap at 48.

The hollow cap 49 is preferably threaded to screw into the body portion as indicated to hold all parts of the discharger solidly together. It has an internal flange or top portion 50 with a large central opening through which the resiliently supported terminal 42, before referred to, passes.

This terminal 42 is preferably in the form of a cylindrical plunger having an enlarged circular head or flange 51, and is engaged and outwardly pressed by suitable spring means, preferably in the form of dished washers 52 which are heat-treated to spring temper and grouped, as shown, between the plunger head 51 and the inner face of the electrode 46. Such a spring is known in the art as a Bellville spring, and is especially useful here in distributing the axial pressure uniformly about the electrode and the plunger head, to provide a large area of contact between its several members and between it and the plunger head and electrode for a good conductive path for the current and one not subject to deterioration or damage thereby of its function as a spring.

This spring is surrounded by a sleeve or tubing 53 lining the cap 49, and the chamber is sealed by the disc ring 54, both of which are of suitable insulating material.

The cap 49 when tightened includes the seal plate 54 and tube 53, the latter pressing against the dielectric 47 and the latter against the peripheral seat in the body 43, so that all are clamped together in rigid sealed relation. The terminal 42 is guided in its axial movement by the seal ring or disc 54 and is restrained from outward movement by the flange or head 51 engaging the said ring. The plunger 42 moves in a closely fitting aperture in the seal disc 54. Electrode 46 is pressed by the spring 52 against electrode 45 so that a fixed spark gap is retained. The path for current through the arrester is through the terminal plunger 42, the Bellville spring 52, the electrodes and spark gap (if it is jumped) and through the body 43 and stem 44 to the plate 40. As stated, this plate may be welded or otherwise secured to the cover, the latter is secured to the metal terminal box, the box is secured to the metal bracket 15, and the latter is always suitably grounded.

The cap 49 may be provided with kerfs or slots 55 for the application of a suitable wrench for tightening or loosening same, or its rim may be otherwise formed for that purpose.

These button dischargers are thus ruggedly constructed and are not subject to derangement or breakage through rough handling. They are readily mounted on the cover, and when so mounted and the cover closed and secured in position, the spring plungers engage and satisfactorily contact the ends of the corresponding studs or binding posts 20 and furnish lightning arrester protection to the lines connected therewith. When the cover is removed, the terminal box parts are as accessible for all servicing as before and as if no dischargers were present.

It may happen that less than all possible lines are connected to the box, in which case only those arresters required need be supplied. It may also happen that some lines connected to the box do not need the protection, while the others do need it, in which case only those needing the protection may be supplied, the other holes in the cover being left unfilled.

The buttons themselves are small, are unitary self-contained devices, are factory assembled and adjusted, are not liable to get out of order in handling, and the service men may be supplied with a quantity to carry in their kits to use when and where desired.

It will be understood, of course, that the drop wires are adapted to be connected to the binding posts 20 at their front ends, by the binding nuts 25, and are then passed laterally through the adjacent holes 60 in the fanning strips 22 and 23, and thence downwardly in the side passages of the box and out to the subscribers, the sliding covers 29 at the bottom openings of said passages permitting the wires to pass therethrough. The subscribers' lines, therefore, are connected to the said binding posts 20, and the arresters or dischargers which contact with said posts when the cover of the box is closed thus furnish the said lines with the desired protection.

In many forms of standard terminal boxes already installed, such buttons may be applied without installing new boxes, and in some no greater change than a new cover may be required. While the supporting plate 40 is here shown attached to the cover, and that is preferred, it is realized that other means may be employed without departing from the broad scope and principle of the invention as hereinafter defined.

Without further elaboration, the foregoing will so fully explain the gist of my invention that others may, by applying current knowledge, readily adapt the same for use under varying conditions of service without eliminating certain features which may properly be said to constitute the essential items of novelty involved, which items are intended to be defined and secured to me by the following claim.

I claim:

A button-type lightning arrester comprising a two-part metallic enclosing body casing, one of said parts being in the form of a flat shallow cup forming the main body portion of the casing and a mounting and terminal for the arrester and having a threaded attaching stem projecting externally from the bottom of the cup and operated by rotating the cup, the other part of the casing being in the form of a flat cap the rim of which threadably engages interiorly of the side walls of the body cup and having an apertured top, a terminal button projecting outwardly from said casing through said apertured top and having an enlarged head within the casing, an insulating disc within the top through which the shank of the said terminal button projects and may move and its head cannot pass, a pair of dielectrically spaced electrode plates within the casing, one of said electrode plates being seated flatly in the bottom of the said main body portion and making electric contact therewith, a conductive spring between the head of said terminal button and the other of said electrode plates and tensioned to press the electrodes together and the terminal button outwardly, and an insulating sleeve lining the rim of the cap and surrounding said spring and said other electrode.

JOHN S. BAKER.

REFERENCES CITED

The following references are of record in the file of this patent:

UNITED STATES PATENTS

| Number | Name | Date |
| --- | --- | --- |
| 623,771 | Donaldson | Apr. 25, 1899 |
| 1,150,926 | Britton | Aug. 24, 1915 |
| 1,736,028 | Winklehaus | Nov. 19, 1929 |
| 1,899,540 | Towne | Sept. 11, 1931 |
| 2,242,838 | Somes | May 20, 1941 |
| 2,399,390 | Robertson | Apr. 30, 1946 |
| 2,399,502 | Olsen | Apr. 30, 1946 |
| 2,415,945 | Gilson | Feb. 18, 1947 |